UNITED STATES PATENT OFFICE.

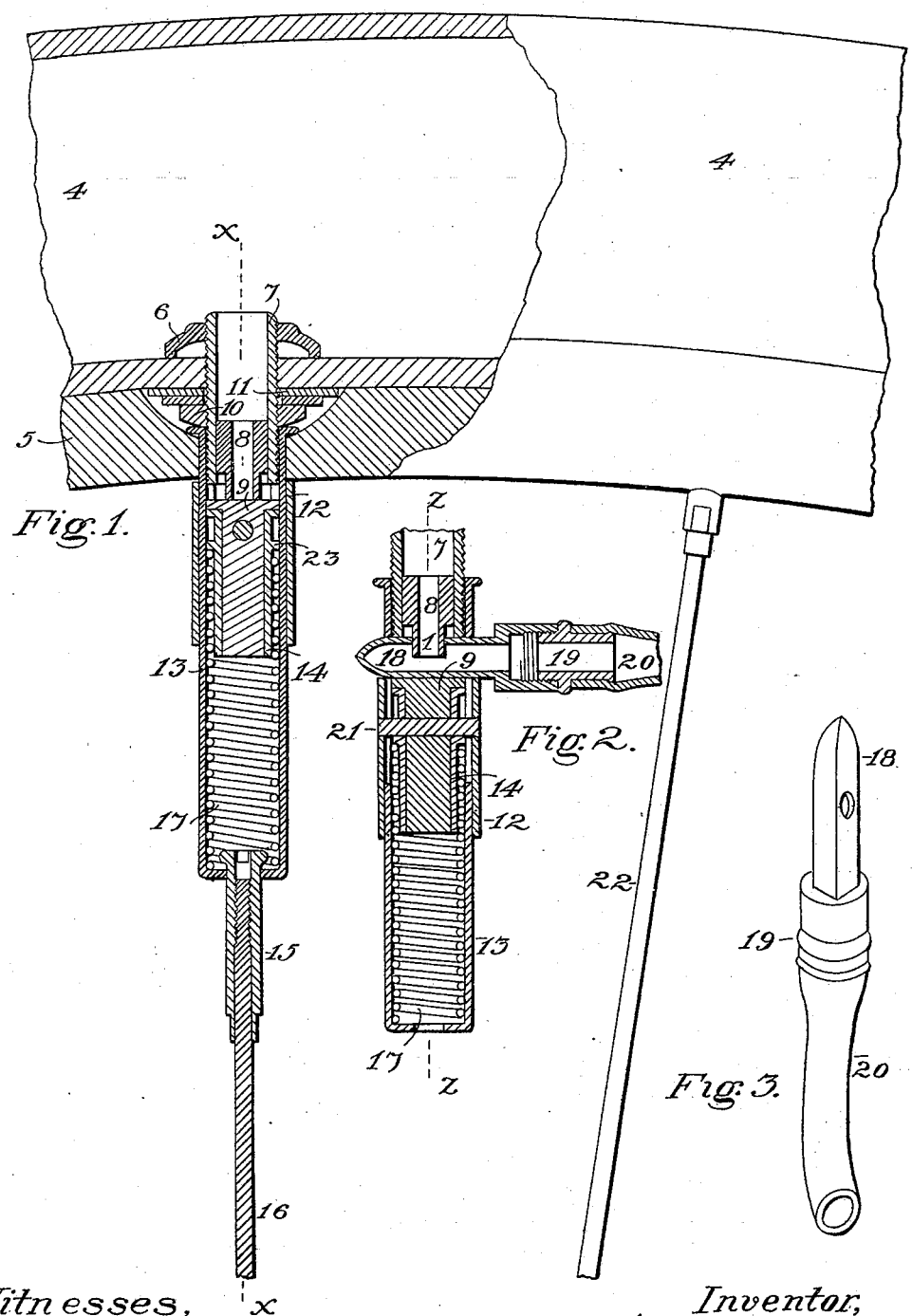

ALBERT O. WARNER, OF DENVER, COLORADO, ASSIGNOR TO TIMOTHY G. ALDRICH, OF SAME PLACE.

VALVE FOR INFLATING PNEUMATIC TIRES.

SPECIFICATION forming part of Letters Patent No. 628,617, dated July 11, 1899.

Application filed March 17, 1898. Serial No. 674,149. (No model.)

*To all whom it may concern:*

Be it known that I, ALBERT O. WARNER, a citizen of the United States, residing at Denver, in the county of Arapahoe and State of Colorado, have invented a new and useful Valve for Inflating Pneumatic Tires, of which the following is a specification.

My invention relates to improvements in valve caps and covers in which the device is operated in conjunction with one of the spokes of the wheel; and the objects of my improvement are, first, speed in operating; second, to dispense entirely with the screw-cap now in use; third, to obviate the liability of causing leakage of air by the twisting of the valve in the valve-stem whenever it becomes necessary to remove a tight screw-cap by the aid of pliers; fourth, to strengthen the rim by combining the device with one of the spokes, thus dispensing with one hole in the rim; fifth, to allow the operator greater and more convenient working space while filling the tire, and, sixth, to prevent the valve connection from being drawn backward and forward by a "creeping" tire by reason of the device being built in the wheel and drawn tightly into position by the spoke attached to it. I attain these objects by the mechanism illustrated in the accompanying drawings, in which—

Figure 1 is a vertical section of the tire, rim, device, and spoke to which the device is attached, all of which are twice the normal size; Fig. 2, a vertical section of my invention, showing the pump connection in place. Fig. 3 is a view of the pump connection double size.

Similar numerals refer to similar parts throughout the several views.

The metal cap or "button" 6, the tube 7, the washer 11, the nut 10, and the smaller tube 8 for narrowing the orifice for the valve cap or cover are the several parts of the usual connection of the pneumatic tire with the pump. The thin metal tube 13, having a flange at the upper end and an orifice at the lower to admit the smaller end of the spoke-nipple 15, which is secured to the spoke 16, to protrude, the flange taking the place of the spoke-nipple head, contains the valve cap and cover mechanism which comprises the spiral spring 17, into which fits the valve-cap 14, extending as far as the flange 23, the upper end of which valve-cap at 9 is covered with soft rubber to effectually close the orifice 8 at end of the air-tube 1 after the tire has been inflated, the sliding ferrule 12 surrounding the metal tube 13 and connected with and fastened to the valve-cap by the metal pin 21, which passes through the valve-cap. The valve-cap is operated by grasping the ferrule 12 firmly with the thumb and fingers of one hand and pressing it toward the center of the wheel, thus forcing back the spiral spring, withdrawing the valve cap and cover from the orifice leading to the tire, and disclosing the opening through the sides of the tube 13, into which opening is placed the pump connection 18, with the circular hole uppermost, so that it will admit the projecting tube 1 at the extremity of the orifice 8 and release the ferrule, and the pump connection is complete. When the tire is inflated, the pump connection or nozzle is released by again sliding the ferrule toward the center of the wheel, removing the nozzle, and releasing the ferrule, which again returns to its place, forcing the rubber head of the valve-cap over the orifice 8, securely closing it.

What I claim as my invention, and desire to secure by Letters Patent, is—

1. In valves for inflating pneumatic tires, the combination of a sliding ferrule and a spiral spring, operating automatically a metal valve cap and cover, the ferrule and valve-cap connected together through a longitudinal slot in a flanged metal tube connected at one end to the rim and at the other end to one of the spokes, and within which tube is contained a seat for the valve-cap.

2. The combination in valves for inflating pneumatic tires, of an automatic valve cap and cover, with a hollow four-sided air force-pump connection having a pointed or wedge-shaped end, and a small circular orifice on one side near said pointed end to connect with the air-tube leading to the interior of the pneumatic tire, and all in connection with said air-tube and a spoke of the wheel for the purposes specified.

ALBERT O. WARNER.

Witnesses:
T. G. ALDRICH,
CHAS. COLMAN.